UNITED STATES PATENT OFFICE.

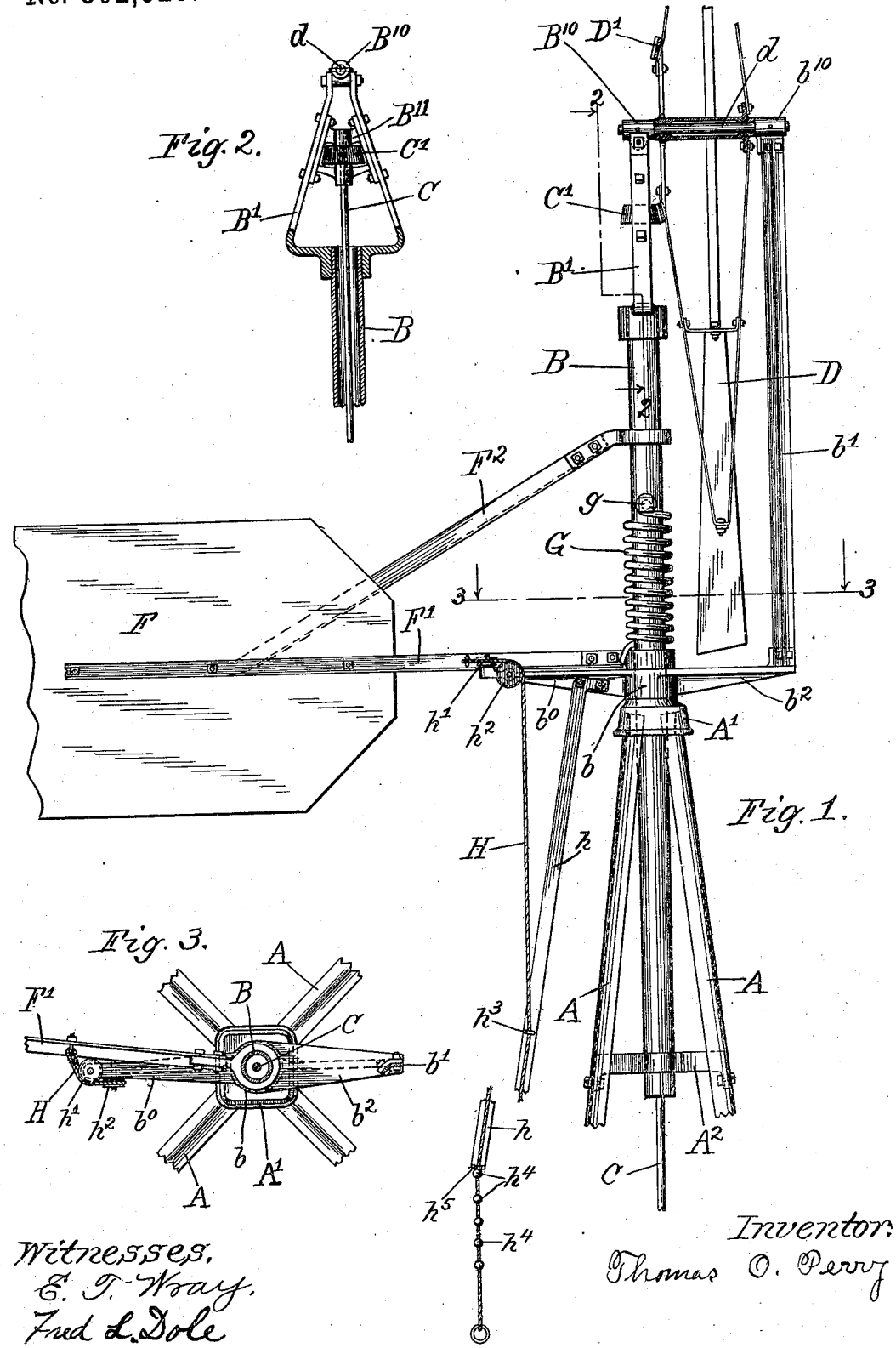

THOMAS O. PERRY, OF CHICAGO, ILLINOIS.

WINDMILL.

SPECIFICATION forming part of Letters Patent No. 502,528, dated August 1, 1893.

Application filed January 31, 1893. Serial No. 460,272. (No model.)

*To all whom it may concern:*

Be it known that I, THOMAS O. PERRY, a citizen of the United States, residing at Chicago, county of Cook, and State of Illinois, have invented certain new and useful Improvements in Windmills, which are fully set forth in the following specification, reference being had to the accompanying drawings, forming a part thereof.

In the drawings,—Figure 1 is a sectional side elevation of the upper portion of a wind mill tower and of the turn-table or rotatable support for the wind wheel, the latter being shown in the section axially through its hub, the lower part of the tower and upper part of the wheel and outer part of the rudder being broken away. Fig. 2 is a detail section at the line 2—2 on Fig. 1. Fig. 3 is a detail section at the line 3—3 on Fig. 1.

A A are conventional representations of corner posts of a tower secured together by the cap A' at the top. The turn-table comprises the vertical tubular stem B, which extends down through the center of the cap A' of the tower, obtaining bearing therein, and a further bearing in the cross tie $A^2$ at a distance of several feet below the top of the tower.

$b$ is a stop collar on the tubular stem B, above the tower top or cap A', by which the said tubular stem is vertically stopped and supported on the tower top. This collar has certain horizontal arms with respect to which it may be referred to as a hub. The function of these arms will be hereinafter explained. This stem extends upward above the tower top for a distance about equal to its downward extent from the same point, and at the upper end it has made rigid with it the yoke or bracket B', whose form is most clearly seen in Fig. 2, and which has at the upper end or apex a support $B^{10}$ for the wind wheel axle or shaft, and below the upper end between its arms the yoke $B^{11}$ securely bolted to it and rigid with it, in which the vertical shaft C obtains its upper bearings, between which bearings the beveled pinion C' on said shaft is located.

$d$ is the axle or shaft of the wind wheel D, having one end supported, as stated, in the seat or bearing $B^{10}$ provided at the upper end of the yoke B'. Another support for this axle or shaft is provided by means of a horizontal arm $b^2$, extended out from the hub or axle $b$, from the outer end of which arm the standard or vertical bar $b'$ extends upward parallel with the tubular stem B, and has secured to its upper end a seat or bearing $b^{10}$ in line with the bearing $B^{10}$. The wind wheel D is journaled on this axle between the two seats or bearings $B^{10}$, $b^{10}$, the shaft $d$ being pinned fast in both said seats or bearings so that it constitutes a tie joining them, and thereby completing a rigid rectangular frame, of which the uprights are, on one side, the tubular stem B and the yoke or bracket B', and on the other side the upright standard or bar $b'$; and the upper and lower ends are respectively the horizontal arm $b^2$, and the horizontal wind wheel axle $d$.

D' is a beveled gear formed as a part of the wind wheel frame at the center thereof, facing and meshing with the beveled pinion C' and thereby communicating rotary motion to the shaft C, which is transmitted down the center of the tower to whatever mechanism may be operated thereby below. By this construction I am enabled to locate the entire wind wheel above the tower top and thereby to bring it close to the vertical axis of its turn-table or supporting frame, and avoid the loss of power due to the obstruction which the tower offers to the wind when the wind wheel extends down below the top of the tower, and is deprived by such obstruction of some portion of the force of the wind.

In order that the upright standard or bar $b'$ may not only offer the least possible resistance to the wind,—this bar being the only thing in front of the wheel which might obstruct the wind,—but also may to some extent tend to assist the directing of the wind against the vanes or sails of the wheel, and thereby compensate for what little obstruction it does offer, I make it of the form which most clearly appears in Fig. 3, presenting an edge to the wind and folded at a vertical line about midway in its width so that the portion of the width nearest the wheel stands at an oblique angle, the angle being preferably about forty-five degrees divergent from the direction of the wind or plane at right angles to the wheel, so that the wind striking this bar is deflected as it passes it and directed against the sails at the most effective angle for driving them. This folding or bending of the upright standard very greatly stiffens it and thereby, in addition to increasing the effectiveness upon the wheel of some portion of the wind which would otherwise only be obstructed by the bar, I am able to make the bar itself much thinner, so that even the edge which it must of necessity present directly in the teeth of the wind, and which will receive and obstruct some portion of the force of the latter, is reduced to the minimum.

The representation in the drawings of the rudder or means of steering the wind wheel, or keeping it either in the wind or out of the wind according as the rudder may be set, is intended to be conventional only. Any known means for this purpose may be employed in connection with the features above described which constitute the invention, which it is my purpose to present in this application. I will, however, describe the conventional means illustrated.

F is the rudder vane pivoted by means of its two arms F' and $F^2$ on the stem B of the turn-table and operated upon by a spring G, which is coiled about the stem B and stopped at one end thereon by the bolt $g$, the other end of the spring bearing against the arm F' of the rudder, the direction of tension of the spring being such that it tends to hold the wheel out of wind; that is, to hold the rudder parallel with the wheel. For the purpose of holding it in the wind a cable H, connected to the bar F' of the rudder, extends over guide pulleys $h'$ and $h^2$, which are mounted on an arm $b^0$ which extends out from the hub or axle $b$ for this purpose. This cable extending down alongside the tower may be kept from entanglement with the latter by passing through guides $h^3$ on a bar $h$ made rigid with the turn-table, as by being bolted to the arm $b^0$ as shown. The cable whose lower end will be within reach of an operator standing on the ground, or at such other place as may be convenient, may be secured after being pulled down so far as necessary to set the rudder at any desired angle to the plane of the wheel, by lodging one of the knots $h^4$ which are secured to the cable, in the notch of the fork $h^5$ with which the bar $h$ may be terminated. This last described expedient for locking the cable is set forth and claimed in my pending application, Serial No. 455,720, filed December 19, 1892.

I claim—

1. In combination with the tower, the tubular stem B extending down through the center of the tower and journaled vertically and supported on the tower top, and journaled at a point at a distance below the top, and extending up above the tower top, and provided at the upper end with a support for one end of the wheel axle; and a rigid arm extending out from the said stem above the tower top, and an upright standard at the end of said arm provided at its upper end with a support for the wind wheel axle; and the wind wheel on said axle between said stem and upright bar, substantially as set forth.

2. In combination with the tower, a turn-table comprising a vertical stem extending down through the center of the tower and vertically journaled at the tower top, and having a further journal bearing at a distance below the tower top, and having the portion which extends above the tower forming one side of a rigid rectangular frame, the upper bar of which constitutes the wind wheel axle, substantially as set forth.

3. In combination with the turn-table comprising the tubular stem B, and the horizontal arm $b^2$ and axle $d$, both rigid therewith; the wind wheel journaled on the axle, and the upright standard $b'$ in front of the wheel and connecting the arm $b^2$ and the axle; said upright being made of a thin metal bar bent at a longitudinal line to render its rear portion a lip oblique to the plane of the wheel, substantially as set forth.

4. In a wind mill, a support for the forward end of wheel axle or shaft consisting of a thin metal bar bent at a longitudinal line to render its rear portion a lip oblique to the plane of the wheel, as and for the purpose set forth.

In testimony whereof I have hereunto set my hand, in the presence of two witnesses, at Chicago, Illinois, this 5th day of January, 1893.

THOMAS O. PERRY.

Witnesses:
W. H. TOWN,
ISAAC R. WOOD.